June 30, 1931.  W. P. VAN LAMMEREN  1,812,814
PROPELLER
Filed Nov. 20, 1930
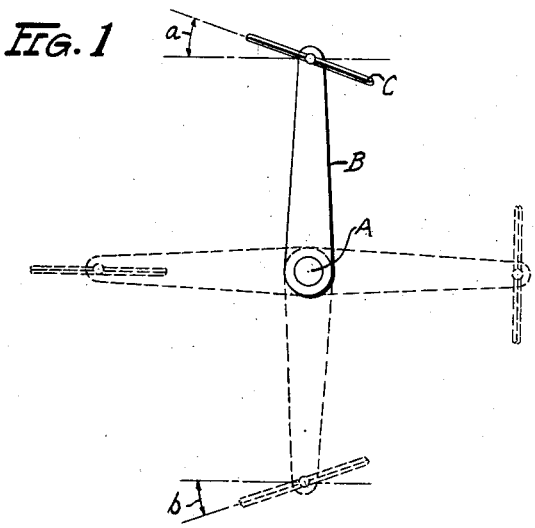
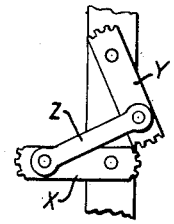
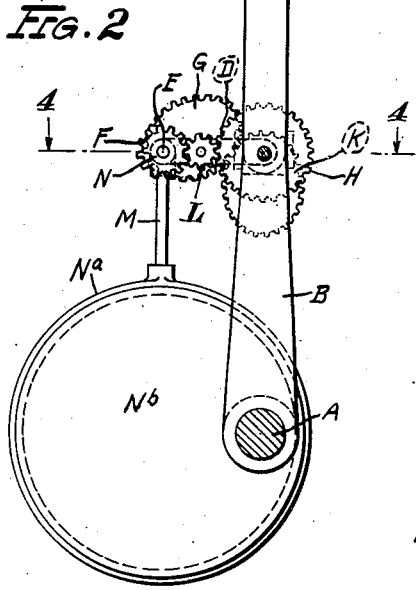
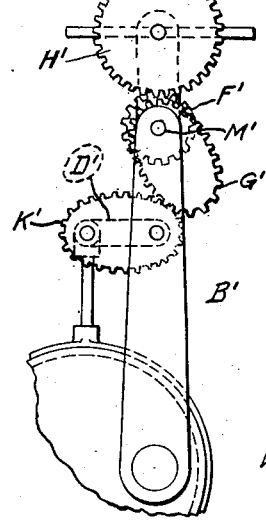
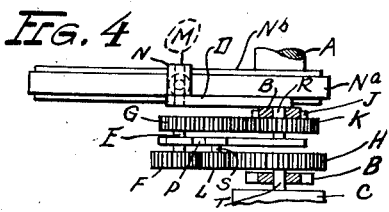
INVENTOR
WILLEM P. VAN LAMMEREN
BY
ATTORNEY Patented June 30, 1931

1,812,814

UNITED STATES PATENT OFFICE

WILLEM P. VAN LAMMEREN, OF VOORSCHOTEN, NETHERLANDS

PROPELLER

Application filed November 20, 1930, Serial No. 496,907, and in Great Britain June 18, 1929.

This invention relates to rotary propellers of the type comprising blades or wings pivotally mounted on axes disposed around a common axis about which the rotary propeller carrying the blades or wings is rotatable.

The object of the present invention is to provide improved means for feathering the blades or wings during the rotation of the propeller, for effective driving purposes in a single direction.

According to the present invention, rotary propellers of the type stated are provided with one or more symmetrically shaped blades or wings, and with feathering means adapted to give the blades or wings a small negative angle of incidence during the first part of their upward stroke, and a small positive angle of incidence during the second part of the said stroke, as well as to maintain the blades or wings, during the down stroke thereof, at right angles or substantially at right angles to the direction in which the propeller moves, or is to be moved, as a whole.

In order to carry out the said feathering movement, it is necessary to impart a varying angular movement to each blade relative to the uniform movement of the rotary propeller. Moreover, if the rotation of the propeller is in a clockwise direction, the rotation of the blades should be in an anticlockwise direction, and vice versa.

The variations in the relative angular movement of each blade is such that only a small reverse movement is imparted to the blade during its up stroke, the said reverse movement corresponding to a small decreasing negative angle of incidence during the first part of the up stroke, and a small increasing positive angle of incidence during the second part of the said stroke. During the down stroke of the blade, a comparatively large reverse movement is imparted to the blade, corresponding to the amount of movement required in order to keep the blade at right angles or substantially at right angles to the direction in which the propeller as a whole is to be moved or is moving.

As will be understood from the foregoing, each blade rotates half a revolution on its own axis during each complete revolution of the rotatable propeller. Hence the necessity for the symmetrical shape of the blade in order to obtain the necessary angles of incidence during each revolution.

Preferably, the feathering of the blades as above described is effected by gearing adapted to transmit, with a variable velocity ratio, feathering movement to the blades or wings from driving means on the rotary propeller. The said gearing may comprise toothed wheel members of elliptical or like contour, the axes about which the wheels rotate coinciding with focal points thereof, or such non-central points of the wheels as permit correct engagement of the teeth throughout the whole of the drive. A reduction gearing may also be arranged between the driven elliptical toothed wheel or the like and the shaft of the corresponding blade or wheel. The cross section of the blades may be either of uniform depth or of varying depth as, for example, in blades of symmetrical leaf-shaped or aerofoil shaped cross section.

Constructional embodiments of the invention will now be described, by way of example, with reference to the drawings filed herewith, in which:

Figure 1 is a diagrammatic view of a rotary propeller in side elevation;

Figure 2 is an enlarged side view of the gearing for feathering a blade of the propeller;

Fig. 3 is an edge elevation of the device shown in Fig. 2 and looking from the right in that figure;

Fig. 4 is a section taken substantially along the line 4—4 in Fig. 2;

Figure 5 is an enlarged side view of a modified gearing for feathering the blades;

Figure 6 is a fragmentary side view of a modification of a detail of the gearing.

Throughout the drawings, similar parts are indicated by the same reference numerals.

As shown in Figure 1, the rotary propeller comprises symmetrically shaped blades C pivotally mounted on radial arms or spokes B, one only of which is illustrated. The spokes B with the wings C carried thereby are rotatable as a whole about the shaft A, the direction of rotation, in the example illustrated, being anti-clockwise. In the said Figure 1, a indicates the small positive angle of incidence of the blades at the top of their rotary paths, whilst the small negative angle of incidence of the blades is indicated by b.

The gearing for feathering the blade C is shown best in Figs. 2, 3 and 4, from which it will be seen that the radial arm B has a lever D secured to the shaft R which is rotatably mounted in the arm B. Also secured to the shaft R is an arm P. This arm P carries the shafts E and S, the former being rotatably mounted in the arm and the latter being preferably secured thereto and carrying an idler L. The shaft T, rotatably mounted in another branch of the arm B, is secured to the propeller blade C and carries a gear H which meshes with the idler L. The shaft E carries the gear F which is in mesh with the idler L and elliptical gear G, which is in mesh with a similar elliptical gear K mounted on the shaft R and held against rotation relative to the arm B by means of the projections J which straddle the arm B on opposite sides thereof as is best illustrated in Figs. 3 and 4. The end of the arm D which is remote from the shaft R is pivotally connected to the rod M at N, the other end thereof being secured to the strap $N^a$ fixed thereto and embracing an eccentric $N^b$, the latter being mounted on a fixed support.

The operation of the feathering means is as follows:

The rotation of the arm B with its elliptical toothed wheel K about the central axle A imparts angular movement to the elliptical toothed wheel G, the ratio of the movement of the wheels K and G varying by virtue of the elliptical contour thereof. As will be clear, the wheel G with its shaft E makes one revolution for each revolution of the arm B about the axle A. This complete revolution of the wheel G and shaft E is transmitted by the reduction gearing F, L and H to the blade C, the reduction ratio being such that for each revolution of the shaft E corresponding to a complete revolution of the arm B, the blade C makes only a half revolution, or if the arm B makes a half revolution, the blade C makes only a quarter revolution. As shown in Figure 2, the arrangement of the feathering means is such that the blade C is feathered as shown diagrammatically in Figure 1, the blade being kept substantially parallel to itself on the down stroke thereof and being kept at a small negative angle of incidence during the first part of its up stroke and at a small positive angle of incidence during the second part of the up stroke. During rotation of the arm B the arm M rotates about the eccentric $N^b$ whereby rotary movement is imparted to the arm D.

The modified form of feathering gear shown in Figure 5 is distinguished from that shown in Figures 2 and 4 inasmuch as the elliptical toothed wheel K' is fixed upon the lever D' instead of directly on the radial arm B'. Consequential upon this distinction, the other elliptical toothed wheel G' and the co-axial pinion F' are fulcrumed directly on an axle M on the said arm B', the pinion F' meshing with a pinion wheel H' coaxially mounted on the axle of the blade E' as in the form of the invention described in Figures 2 to 4.

A further modification of the elliptical gearing hereinbefore described is shown in Figure 6. As will be seen, this modification comprises a pair of segmental toothed members X and Y, which take the place of the complete elliptical toothed wheel of the feathering gearing previously described. Virtually, the segmental toothed members X and Y constitute a pair of cranks, the member X taking the place of, and being mounted in similar manner to, the lever D' (Figure 5), and the two members X and Y being connected by a rod Z, the length between the pivots of which is the same as the major axis of the ellipses (Figure 6) equivalent to the said segmental members X, Y.

If desired means may be provided for changing the position of the axes of the elliptical toothed wheels or equivalent members relative to the toothed contours of the said wheels or members, it being thereby possible to effect corresponding change in the variation of the ratio between the movement of the blades C and the rotary propeller as a whole.

Having now particularly described and ascertained the nature of my said invention and in what manner the same is to be performed, I declare that what I claim is:

1. In a propeller for helicopters the combination with a blade support rotatable about an axis, of a blade on said support rotatable about a second axis, an arm movable about a third axis and connected by a link to said support to move in predetermined relation to said support when said support is rotated, said link being pivoted to said arm and to said support, a driving gear adapted to rotate in a predetermined direction at a speed proportional to the speed of rotation of said support and actuated by said support when the latter is moved, and a gear train between said driving gear and said blade for rotating said blade at a varying speed, said varying speed of said blade being such that the working surface of said blade during the working stroke is presented at substantially right angles to the direction in which the propeller as a whole moves and so that during substantially the first half of the non-working stroke the blade is at a very slight negative angle of incidence to the path of movement of said blade.

2. A device as claimed in claim 1 in which the blade occupies a small positive angle of incidence to the path of movement of said blade during substantially all of the last half of the non-working stroke of said blade.

3. In a helicopter the combination with a blade support rotatable about a predetermined axis, a blade rotatably mounted on said blade support about an axis eccentric to said first axis, a pair of arms rotatably supported on said blade support, one of said arms being mounted on said blade so as to rotate therewith, a link connecting said arms eccentrically of their respective pivots, and an operating member pivoted to said other arm and mounted to rotate about an axis fixed with respect to the axis of rotation of said blade support for actuating said arms as said blade support rotates and to thereby impart a sequence of movements to said blade such that the lifting surface of the blade is at substantially right angles to the path along which the propeller as a unit is adapted to move during the working stroke of said blade and the said lifting surface occupies slight negative and positive angles of incidence to the path of bodily movement of said blade during substantially the first and last halves of the non-working stroke of said blade, respectively.

4. In a propeller the combination with an arm pivoted to rotate about a substantially horizontal axis, of a blade carried by said arm and rotatable thereon about an axis substantially parallel to said first axis, an elliptical gear secured rigidly to said arm, a second arm pivoted to move substantially parallel with said first arm, an elliptical gear on said second arm meshing with said first gear, a third gear driven by said second elliptical gear, and a fourth gear meshing with said third gear and secured to said blade to rotate said blade when said arms rotate, said elliptical gears causing said blade to rotate at a variable speed such that the lifting surface of said blade is substantially perpendicular to the line of bodily movement intended to be given to the plane by said propeller during flight and causing the blade to occupy a relatively small negative angle of incidence as it begins its non-working stroke.

5. In a propeller the combination with an arm pivoted to rotate about a substantially horizontal axis, a propeller blade support, a blade rotatably mounted on said support about an axis substantially parallel to the axis of rotation of said arm, a gear for rotating said blade about its axis and a variable speed driving mechanism actuated by said arm as it rotates for positively driving said gear about its axis with a varying speed such that the blade moves through substantially parallel positions during its working stroke and has a small negative angle of incidence during the first part of the non-working stroke, the working surface of the blades during working stroke being arranged substantially perpendicular to the line of movement intended to be given to the helicopter by said propeller, said variable speed mechanism comprising a train of gears the first of which is directly secured to said arm to rotate therewith.

6. A device as claimed in claim 5 in which the propeller blade occupies a small positive angle of incidence during the last part of its non-working stroke.

7. In a propeller for helicopters, the combination with a propeller blade of a rotatable support for said propeller blade and gearing for said blade comprising an elliptical gear fixed to rotate in unison with said support without changing its position relative thereto, a second elliptical gear meshing with said first gear and arranged so that a line through its axis and said first axis is maintained at substantially the same angle relative to the horizontal during rotation of said support and gearing driven by said last mentioned gear for rotating said propeller blades one-half of a complete revolution for each revolution of said support, said elliptical gears causing said gears to rotate at a speed such that the working surface of said blade passes through successive substantially parallel positions during one-half of the rotation of said support said position being also such that the working surface of said blade remains substantially perpendicular to the line in which the propeller is intended to drive said plane and said gearing being adapted to maintain said propeller blade with its working surface at a small negative angle of incidence during the first part of the remaining half of the revolution of said support.

8. A device as claimed in claim 7 in which the propeller blade is maintained at a small positive angle of incidence during the last part of the movement of said support about its axis.

9. In a propeller for helicopters the combination with a rotatable support adapted to rotate about a substantially horizontal axis of a blade rotatably mounted on said support, a pair of elliptical gears mounted on said support one of which is a driving gear and the other of which is a driven gear, means for maintaining the major axis of said driving gear at substantially the same angle relative to the horizontal during rotation of said support and gearing for driving said blade from said driven gear so that said blade travels through successive substantially parallel positions during one-half of the rotative movement of said support and is maintained at substantially a slight negative angle of incidence to the path of the axis of said blade during the subsequent travel of said blade along its path of movement.

10. A device as claimed in claim 9 in which the blade occupies a small positive angle of incidence during the last part of the revolution of said blade about the axis of said support.

11. In a helicopter the combination with arms mounted to rotate about different axes and maintained in substantially parallel positions during rotation by a link pivotally connected to each of said arms, a second link pivoted to one of said arms, gear teeth at the ends of said links, a third link pivoted to each of said first mentioned links adapted to cause said second link to rotate about its pivot as said arms rotate about their pivots and to cause said second link to rotate bodily about said first link, said gear teeth being adapted to cause said first link to rotate in the proper direction when actuated by said third link after the first and second links have been moved into alignment with each other, a blade rotatably mounted on the arm to which said second link is pivoted and gearing connecting said blade and said second link so that as said second link rotates about its axis said blade will be rotated to impart the desired angular movements to said blade.

12. A device as claimed in claim 11 in which the angular movement of said blade is such that the blade passes through substantially parallel positions during the working stroke and is maintained at small negative and positive angles of incidence relative to the path of movement of the propeller axis during the first and last portions of the non-working stroke respectively.

In testimony that I claim the foregoing I hereunto affix my signature.

WILLEM P. van LAMMEREN.